(12) United States Patent
Lebel

(10) Patent No.: US 9,376,301 B1
(45) Date of Patent: Jun. 28, 2016

(54) ADJUSTABLE CAP SORTER

(71) Applicant: Jalbert Automatisation Inc., Boisbriand (CA)

(72) Inventor: Alexandre Lebel, Laval (CA)

(73) Assignee: JALBERT AUTOMATISATION INC., Boisbriand (CA)

( * ) Notice: Subject to any disclaimer, the term of this patent is extended or adjusted under 35 U.S.C. 154(b) by 0 days.

(21) Appl. No.: 14/801,090

(22) Filed: Jul. 16, 2015

(51) Int. Cl.
*B65G 47/24* (2006.01)
*B67B 3/064* (2006.01)
*B65G 47/14* (2006.01)

(52) U.S. Cl.
CPC .......... *B67B 3/0645* (2013.01); *B65G 47/1407* (2013.01)

(58) Field of Classification Search
CPC . B65G 47/12; B65G 47/1407; B65G 47/1478
USPC ............................................. 198/396, 397.01
See application file for complete search history.

(56) References Cited

U.S. PATENT DOCUMENTS

| | | | |
|---|---|---|---|
| 2,609,912 A | 9/1952 | Engel | |
| 2,745,537 A | 5/1956 | Cadman | |
| 2,954,862 A | 10/1960 | Clark | |
| 3,835,985 A | 9/1974 | Johnson | |
| 4,735,343 A | 4/1988 | Herzog | |
| 5,394,972 A | 3/1995 | Aidlin et al. | |
| 5,586,637 A * | 12/1996 | Aidlin ................ | B65G 47/1471 198/396 |
| 6,491,152 B1 * | 12/2002 | Evers, Jr. .......... | B65G 47/1471 198/397.01 |
| 7,040,489 B2 | 5/2006 | Zemlin et al. | |
| 7,597,189 B2 | 10/2009 | Hinsley et al. | |
| 7,972,088 B2 | 7/2011 | Dotson et al. | |
| 8,172,070 B2 | 5/2012 | Gassner | |
| 8,196,371 B2 | 6/2012 | Yuyama | |
| 8,783,439 B2 | 7/2014 | Lopez et al. | |

FOREIGN PATENT DOCUMENTS

| | | |
|---|---|---|
| CA | 2802940 A1 | 1/2012 |
| CN | 102795362 A | 11/2012 |
| CN | 203781294 U | 8/2014 |
| DE | 1556588 A1 | 1/1970 |
| DE | 10052062 A1 | 9/2001 |
| DE | 10341481 A1 | 4/2005 |
| DE | 102007004418 A1 | 7/2008 |
| DE | 102008057902 A1 | 5/2010 |
| EP | 181792 A1 | 10/1985 |
| EP | 1541504 B1 | 6/2006 |
| EP | 2196417 B1 | 9/2011 |
| FR | 2944002 A1 | 10/2010 |

\* cited by examiner

*Primary Examiner* — James R Bidwell

(57) ABSTRACT

A cap sorter comprising: first and second belts traveling along a closed loop belt path substantially adjacent and parallel to each other, the belt path defining a non-vertical cap receiving section, a sorting section extending substantially upwardly therefrom, a discharging section provided above the sorting section and a return section extending from the discharging section and returning to the cap receiving section; a cap providing element provided above the cap receiving section for discharging the caps on the cap receiving section; and first and second belt actuators for moving respectively the first and second belts along the belt path. The first and second belts are each provided with a plurality of cleats mounted outside of the first and second belts, each of the cleats extending across both the first and second belts, the cleats being alternately secured to the first and second belts.

21 Claims, 5 Drawing Sheets

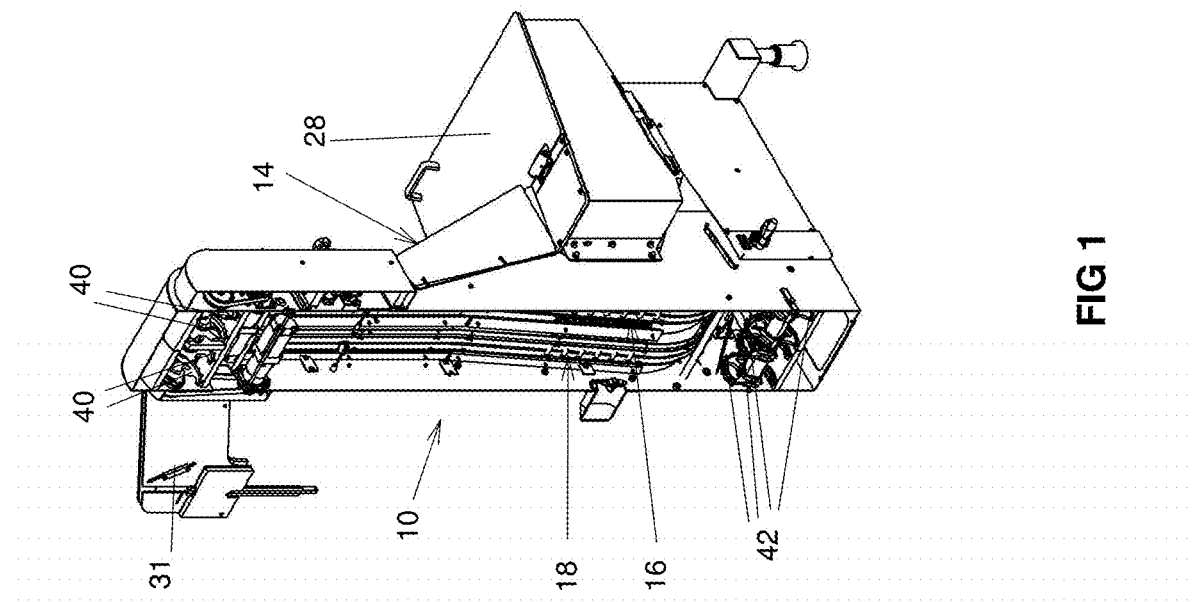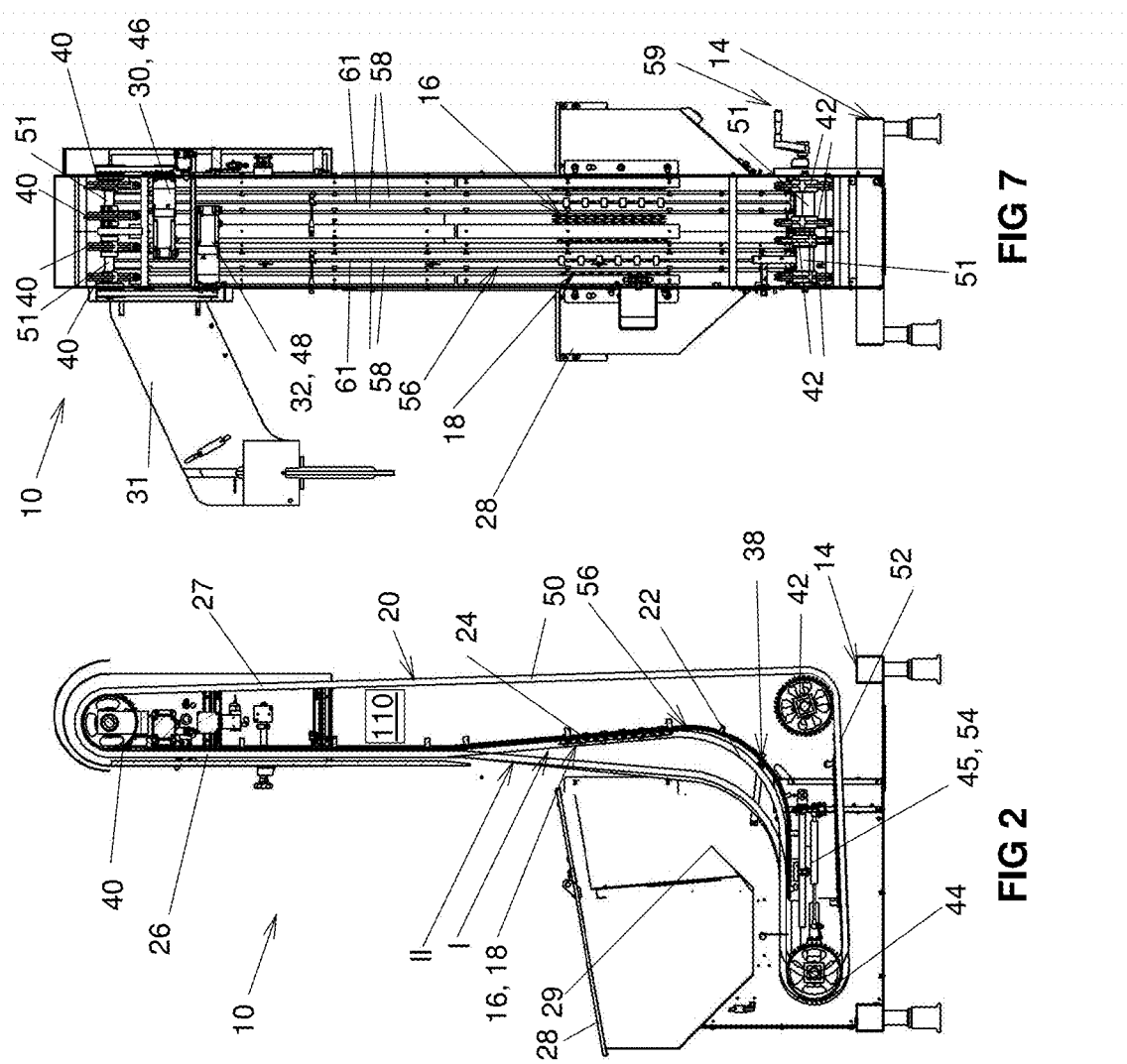

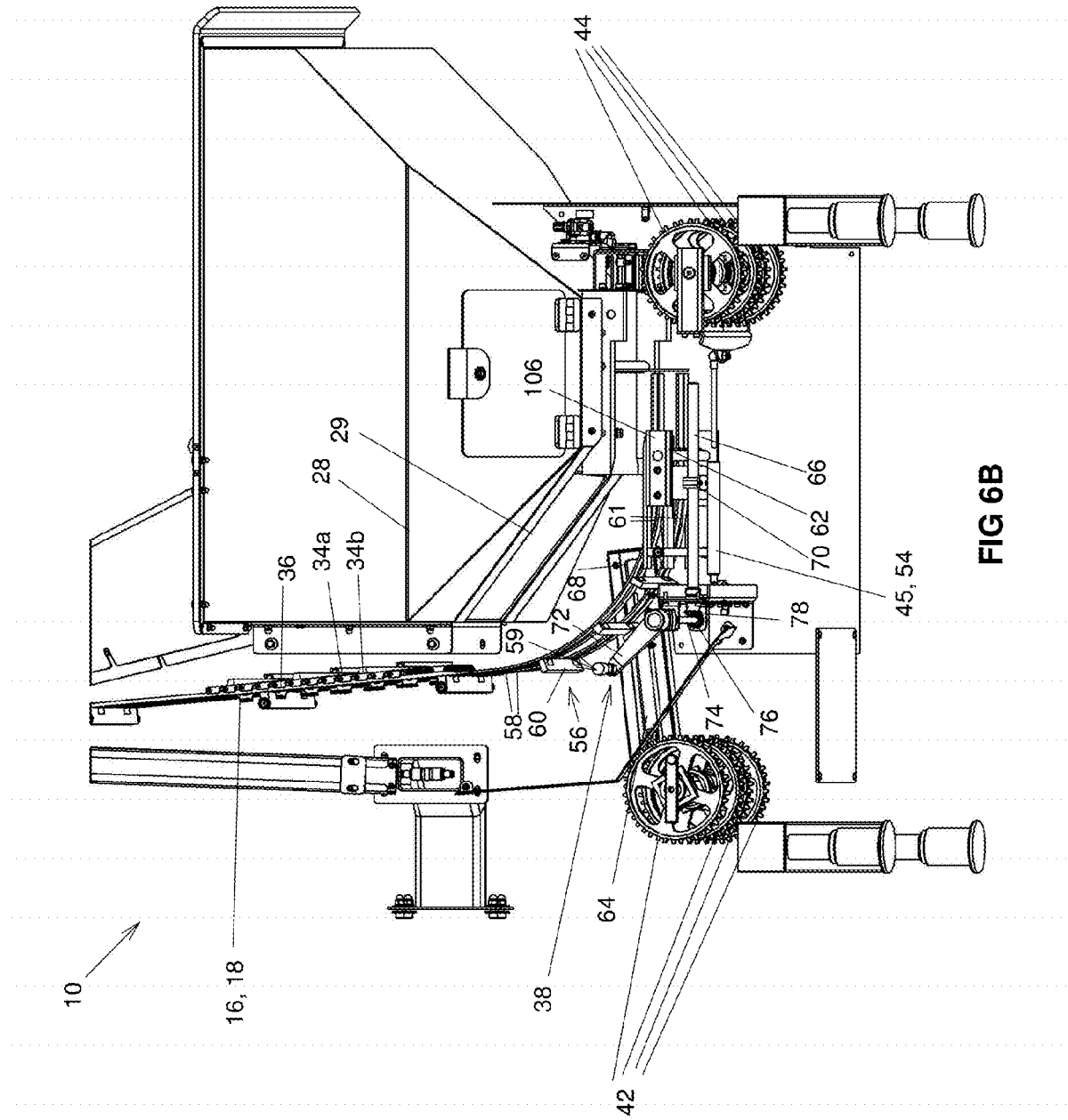

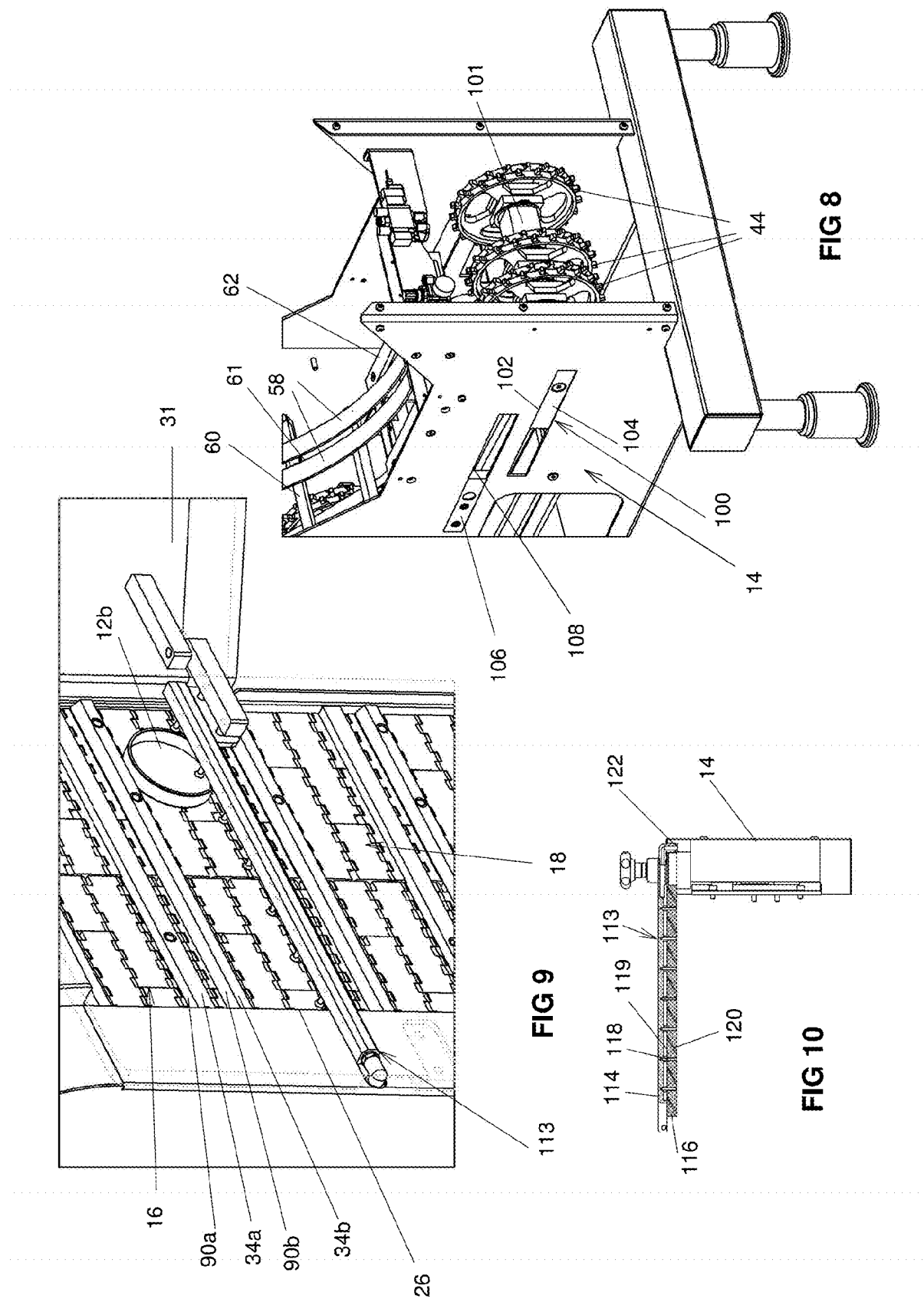

ADJUSTABLE CAP SORTER

FIELD OF THE INVENTION

The present invention relates to the general field of automated packaging and is more particularly concerned with an adjustable cap sorter.

BACKGROUND

Many packaging processes require that caps be sorted from a bulk of randomly oriented cap to a row of similarly oriented caps. A type of commonly used caps includes a cap end wall that will eventually extend across an aperture of a container and a cap peripheral wall that extends away therefrom.

One type of cap sorter uses a belt that forms a loop. In use, the belt will travel along the loop. Part of the loop, called hereinbelow the cap receiving portion, passes below the bulk caps, typically at a slanted angle. The next portion of the loop is close to vertical and is referred to hereinbelow as the sorting portion. Cleats are secured to the belt, generally perpendicularly to the direction of travel of the loop, facing the unsorted cap in the portion of the loop that is below the bulk caps. The distance between the cleats is selected to be approximately equal to the diameter of the end wall. In use, caps that fall between two adjacent cleats in the pickup portion can fall either with their end wall close to the belt, or with their end wall away from the belt. When the belt moves so that these caps are in the sorting portion, only the caps that have their end wall adjacent the belt will remain on the belt, between the cleats. All caps between adjacent cleats that have their end wall away from the belt fall back towards the pickup portion due to the cleats having a thickness small enough that the center of gravity of the caps is then further away from the belt than the thickness of the cleats. Caps that are not engaged between two cleats also fall back to the pickup portion due to gravity.

If the belt is wide enough, many caps can abut downwardly against a single cleat. This is usually not a problem and may even be desirable as this increases the throughput of the cap sorter. Such rows of caps are fed to a chute at the top of the sorting portion so that the oriented caps can be used in other packaging steps. However, the chute feeding mechanism would usually be disturbed if caps became superposed on top of each other between adjacent cleats. To that effect, the cleats are distanced along the belt by a distance that is similar or only slightly larger than the end wall diameter.

When a particular cap sorter is needed for use in processes in which the caps have largely different diameters, the distance between the cleats needs to be changed. This may require removal of all cleats from the belt and reattachment thereto at a different spacing. In some cap sorters, this may require changing the belt completely with a different one having cleats differently spaced apart from each other. Both types of operation a time consuming.

Accordingly, there exists a need for an improved cap sorter. It is a general objective of the present invention to provide such a cap sorter.

SUMMARY OF THE INVENTION

In a broad aspect, the invention provides a cap sorter for sorting caps, the cap sorter comprising: first and second belts, the first and second belts being in a substantially adjacent and substantially parallel relationship relative to each other, the first and second belts traveling along a closed loop belt path defining a longitudinal direction therealong, the belt path defining a cap receiving section inclined from the vertical, a sorting section extending substantially upwardly from the cap receiving section, a discharging section provided above the sorting section and a return section extending from the discharging section and returning to the cap receiving section; and first and second belt actuators operatively coupled respectively to the first and second belts for moving respectively the first and second belts along the belt path; the first and second belts being each provided with a plurality of cleats mounted outside of the belt path, each of the cleats extending substantially laterally across both the first and second belts, the cleats being each secured to one of the first and second belts while being movable relative to an other one of the first and second belts, the cleats alternating between being secured to the first and second belts along the belt path; the first and second belts being selectively movable disjointly and jointly, wherein the first and second belts are moved disjointly by changing a phase between the first and second belt actuators to change a spacing between adjacent ones of the cleats and wherein the first and second belts are moved jointly along the belt path to sort the caps.

The invention may also provide a cap sorter further comprising a belt guiding element for guiding the first and second belts at least in the sorting section so that the first and second belts have a predetermined shape in the sorting section.

The invention may also provide a cap sorter wherein the belt guiding element is configurable between belt guiding element first and second configurations, wherein a belt inclination relative to the vertical of the first and second belts differs between the belt guiding element first and second configurations.

The invention may also provide a cap sorter wherein the belt guiding element is continuously configurable between the belt guiding element first and second configurations.

The invention may also provide a cap sorter wherein the predetermined shape is substantially rectilinear.

The invention may also provide a cap sorter wherein, in the guiding element first configuration, the cleats face downwardly relative to the first and second belts in the sorting section, and, in the guiding element second configuration, the cleats face upwardly relative to the first and second belts in the sorting section.

The invention may also provide a cap sorter wherein the belt guiding element defines a slot extending substantially longitudinally along the belt path, the slot being flanked by two deformable bands that are substantially resiliently deformable, the belt guiding element first and second configurations being achieved by deforming the deformable bands.

The invention may also provide a cap sorter further comprising coupling elements, the deformable bands being linked to each other by the coupling elements which are each secured to both of the deformable bands at substantially longitudinally spaced apart locations along the deformable bands so that the deformable bands deform substantially similarly as the belt guiding element is deformed between the belt guiding element first and second configurations.

The invention may also provide a cap sorter further comprising a body and a caddy, the deformable bands being mounted to the caddy, the caddy being movable relative to the body to deform the deformable bands to move the belt guiding element between the belt guiding element first and second configurations.

The invention may also provide a cap sorter wherein the deformable bands each have a portion thereof that is fixed relative to the body spaced apart from the caddy.

The invention may also provide a cap sorter wherein at least one of the first and second belts defines belt guides extending therefrom at substantially longitudinally spaced apart locations therealong, the belt guides engaging the belt guiding element in the sorting section so that the at least one of the first and second belts conforms to the predetermined shape.

The invention may also provide a cap sorter wherein the at least one of the first and second belts defines a belt inner surface facing the deformable bands and a substantially opposed belt outer surface, the belt guides each including a stem extending from the belt inner surface and an end member extending from the stem opposed to the belt inner surface, the stem being insertable in the slot, the end member being wider than the slot.

The invention may also provide a cap sorter further comprising a tension maintaining mechanism operatively coupled to the first and second belts for maintaining a predetermined tension in the first and second belts as the belt guiding element is moved between the belt guiding element first and second configurations.

The invention may also provide a cap sorter further comprising a body and wheels operatively coupled to the body to guide the first and second belts along at least part of the belt path, the first and second belts being mounted to the wheels, at least one of the wheels being movable relative to the body to accommodate changes in the belt path when the belt guiding element is moved between the belt guiding element first and second configurations.

The invention may also provide a cap sorter further comprising a biasing element operatively coupled to the at least one of the wheels and to the body to maintain the predetermined tension.

The invention may also provide a cap sorter wherein the cleats each define a cap receiving surface facing generally upwardly in the sorting section, the cap receiving surfaces being of a first type for the cleats mounted to the first belt and of a second type for the cleats mounted to the second belt, the cap receiving surface of the cleats of one of the first and second types being substantially perpendicular to the first and second belts and the cap receiving surface of the cleats of an other one of the first and second types being beveled.

The invention may also provide a cap sorter wherein the first and second belts each include a plurality of substantially planar belt elements substantially longitudinally extending from each other and articulated relative to each other.

The invention may also provide a cap sorter further comprising a nozzle substantially adjacent the discharging section for delivering air jets to the caps in the discharging section to transversally move the caps relative to the cleats.

The invention may also provide a cap sorter wherein the first and second actuators each include a stepper servo motor.

The invention may also provide a cap sorter further comprising a cap providing element configured for providing the caps on at least one of the first and second belts in the cap receiving section.

The invention may also provide a cap sorter wherein the cap providing element includes a hopper, the hopper including a cap discharge provided above the cap receiving section, the hopper discharging the caps on the cap receiving section through the cap discharge.

Advantageously, proposed cap sorter allows precise adjustment of the space between adjacent cleats, which allows optimizing the cap sorter to process batches of caps having various diameters. This adjustment as a function of the caps to process can be performed relatively quickly and easily.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the drawings:

FIG. 1, in a perspective view with parts removed, illustrates a cap sorter in accordance with an embodiment of the present invention;

FIG. 2, in a side elevation view with parts removed, illustrates the cap sorter of FIG. 1;

FIG. 6B, in a partial perspective view with parts removed, illustrates the cap sorter of FIGS. 1, 2 and 6A with the guiding element in a guiding element second configuration;

FIG. 7, in a rear plan view with parts removed, illustrates the cap sorter of FIGS. 1, 2, 6A and 6B FIG. 8, in a partial perspective view with parts removed illustrates part of the cap sorter of FIGS. 1, 2, 6A, 6B and 7;

FIG. 9, in a perspective view, illustrates an air delivering element part of the cap sorter of FIGS. 1, 2, 6A, 6B and 8; and FIG. 10, in a top cross-sectional view, illustrates the air delivering element of FIG. 9.

DETAILED DESCRIPTION

Figure 3:
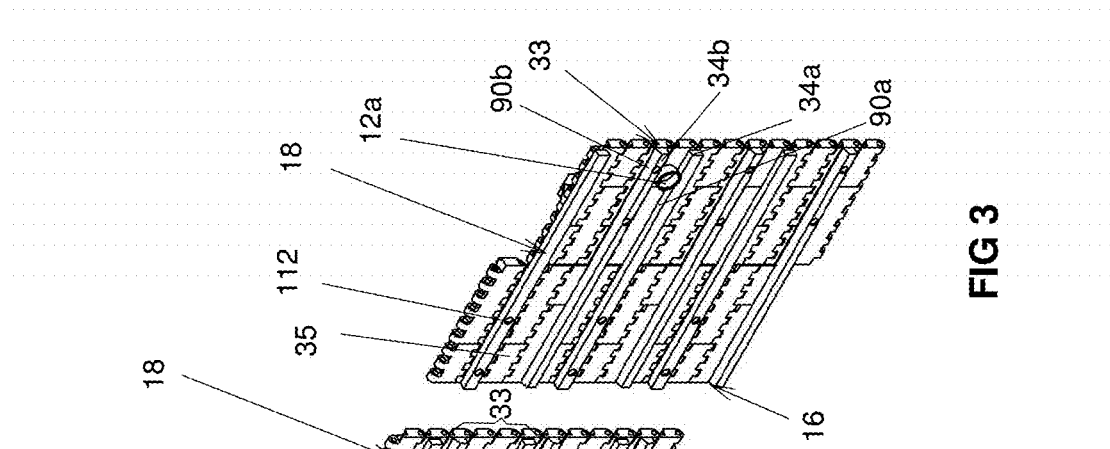
FIG. 3, in a partial perspective view, illustrates belts part of the cap sorter of FIGS. 1 and 2, the belts being in a first configuration.
Figure 4:
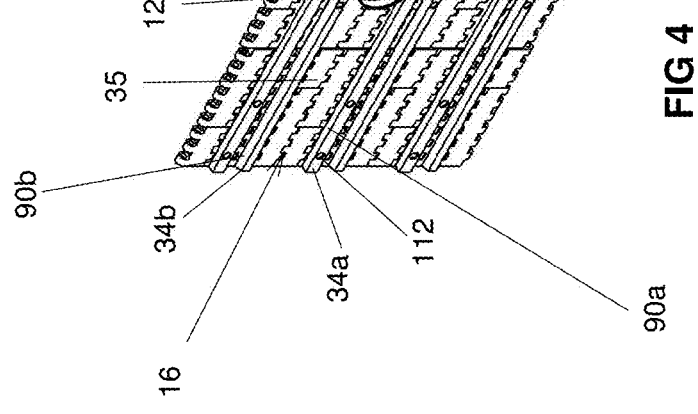
FIG. 4, in a partial perspective view, illustrates the belts of FIG. 3, the belts being in a second configuration.

With reference to FIGS. 1 and 2, there is shown a cap sorter 10 for sorting caps 12a and 12b, shown in FIGS. 3 and 4 respectively. Returning to FIG. 1, the cap sorter 10 includes a body 14 enclosing the moving parts of the cap sorter 10. FIG. 1 shows the body 14 with a rear portion thereof removed to show the internal components of the cap sorter 10, but in a typical embodiment, the rear portion of the body 14 is present in the form of a panel closing this rear portion. The body 14 is conventional and is not described in details herein.

The cap sorter 10 includes first and second belts 16 and 18. While a cap sorter 10 including two belts is show in the drawings and described herein, it is within the scope of the invention to include more than two belts in a similar cap sorter. In such embodiments, increasing the number of discrete belts may be useful to increase the rigidity of the cap sorter 10 as smaller belts will then have less relative movements between their respective lateral side edges. The first and second belts 16 and 18 are in a substantially adjacent and substantially parallel relationship relative to each other. The first and second belts 16 and 18 may contact each other or there may be a small gap therebetween.

In the present document, the terminology "substantially" is used to denote variations in the thus qualified terms that have no significant effect on the principle of operation cap sorter 10. These variations may be minor variations in design or variations due to mechanical tolerances in manufacturing and use of the cap sorter 10. These variations are to be seen with the eye of the reader skilled in the art.

As better seen in FIG. 2, in which most of the length of each of the first and second belts 16 and 18 is only schematically represented as two parallel lines, the first and second belts 16 and 18 are travelling along a closed loop belt path 20 defining a longitudinal direction therealong. In other words, when reference is made to the first and second belts 16 and 18, a longitudinal direction refers to a direction following the first and second belts 16 and 18 around the loop they form. The direction perpendicular to the longitudinal direction and contained parallel to the belts is called the lateral direction.

The belt path 20 defines a cap receiving section 22 inclined from the vertical, a sorting section 24 extending substantially upwardly from the cap receiving section 22, a discharging section 26 provided above the sorting section 24 and a return section 27 extending from the discharging section 26 and returning to the cap receiving section 22. FIG. 2 illustrates two different belt configurations of the first and second belts 16 and 18, indicated by arrows I and II, which differ, among other things, by the slope of the sorting section 24.

In some embodiments, the cap sorter 10 includes a cap providing element configured for providing the caps on at least one of the first and second belts 16 and 18 in the cap receiving section 22. For example, the cap providing element includes a hopper 28 provided above the cap receiving section 22. The hopper 28 is conventional and discharges the caps 12a and 12b (not see in FIGS. 1, 2, 5, 6A, 6B and 7) on the cap receiving section 22 through a cap discharge 29 provided above the cap receiving section 22. It should be noted that in alternative embodiments, the caps 12a and 12b are provided in any other suitable manner, including through another device (not shown in the drawings), conventional or not, that is configured for supplying the caps 12a and 12b to the cap sorter 10.

First and second belt actuators 30 and 32, better seen in FIG. 7, are operatively coupled respectively to the first and second belts 16 and 18 for moving respectively the first and second belts 16 and 18 along the belt path 20. As better seen in FIGS. 3 and 4 respectively, the first and second belts 16 and 18 are each provided with a plurality of cleats 34a and 34b mounted outside of the first and second belts 16 and 18, or in other words outside of the belt path 20, facing outwardly relative to the loop formed by the belt path 20, each of the cleats 34a and 34b extending substantially laterally across both the first and second belts 16 and 18. The cleats 34a and 34b are each secured to one of the first and second belts 16 and 18 while being movable relative to an other one of the first and second belts 16 and 18. The cleats 34a and 34b alternate between being secured to the first and second belts 16 and 18 along the belt path 20. In the specific embodiment of the invention shown in the drawings, the cleats 34a and 34b are secured respectively to the first and second belts 16 and 18.

The first and second belts 16 and 18 are selectively movable disjointly and jointly. To that effect, the first and second belt actuators 30 and 32 are able to move the first and second belts 16 and 18 independently from each other. The first and second belts 16 and 18 are moved disjointly by changing a phase between the first and second belt actuators 30 and 32 to change a spacing between adjacent ones of the cleats 34a and 34b. The first and second belts 16 and 18 are moved jointly along the belt path 20 to sort the caps 12a and 12b.

The cap sorter 10 also typically includes a chute 31 adjacent the discharging section 26, as seen for example in FIGS. 1 and 7. A discharging mechanism is also typically provided adjacent the chute 31. The discharging mechanism for example provides a pulsed air jet or a line of pulsed air jets, that moves the caps 12a and 12b from the first and second belts 16 and 18 to the chute 31.

For example, as seen in FIG. 9, the pulsed air jet(s) is provided by an air delivering element 113 provided substantially adjacent the discharging section 26 which deliver air jets from a compressed air source (not shown in the drawings) to the caps 12a and 12b in the discharging section 26 to laterally move the caps 12a and 12b relative to the cleats 34a and 34b. While other arrangements to deliver pulsed air jets are possible, FIG. 10 illustrates a specific embodiment of the air delivering element 113 in greater details. The air delivering element 113 includes a plate 116 that is substantially parallel to the first and second belts 16 and 18 (not shown in FIG. 10) and spaced apart therefrom so that the caps 12a and 12b travel between the first and second belts 16 and 18 and the plate 116 when the cap sorter 10 is operating. Nozzles 120 are formed in the plate 116 at an angle relative to the first and second belts 16 and 18 at laterally spaced apart locations therealong, typically along a rectilinear line substantially laterally extending substantially parallel to the first and second belts 16 and 18. The nozzles 120 take the form of passageways extending through the plate 113. On the side of the plate 113 opposite the first and second belts, an air guide 118 is provided sealed against the plate 113 and defines a passageway 119 extending along the nozzles 120 and in fluid communication with an air inlet 122. To move the caps 12a and 12b, air is provided to the air inlet through a suitable valve (not shown in the drawings) when the caps 12a and 12b are suitably positioned so that air jets are emitted through the nozzles 120, which moves the caps 12a and 12b in a direction leading towards the chute 31.

Figure 6A:
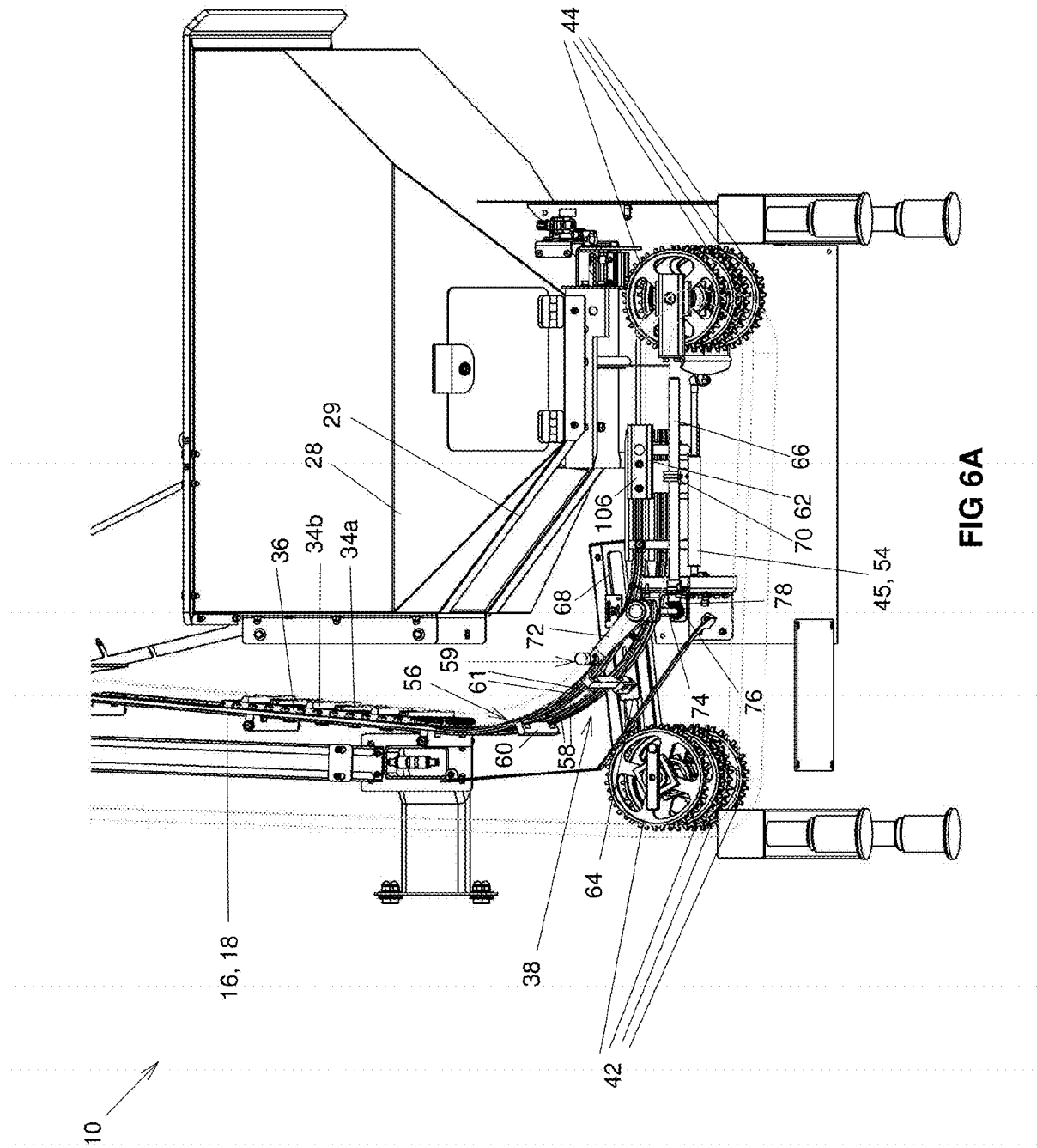
FIG. 6A, in a partial perspective view with parts removed, illustrates the cap sorter of FIGS. 1 and 2 with a guiding element thereof in a guiding element first configuration.

In some embodiments, a belt shape adjuster 38, better seen in FIGS. 6A and 6B, is provided to selectively adjust the shape of the first and second belts 16 and 18 in the cap receiving and sorting sections 22 and 24, as further described hereinbelow.

Figure 5:
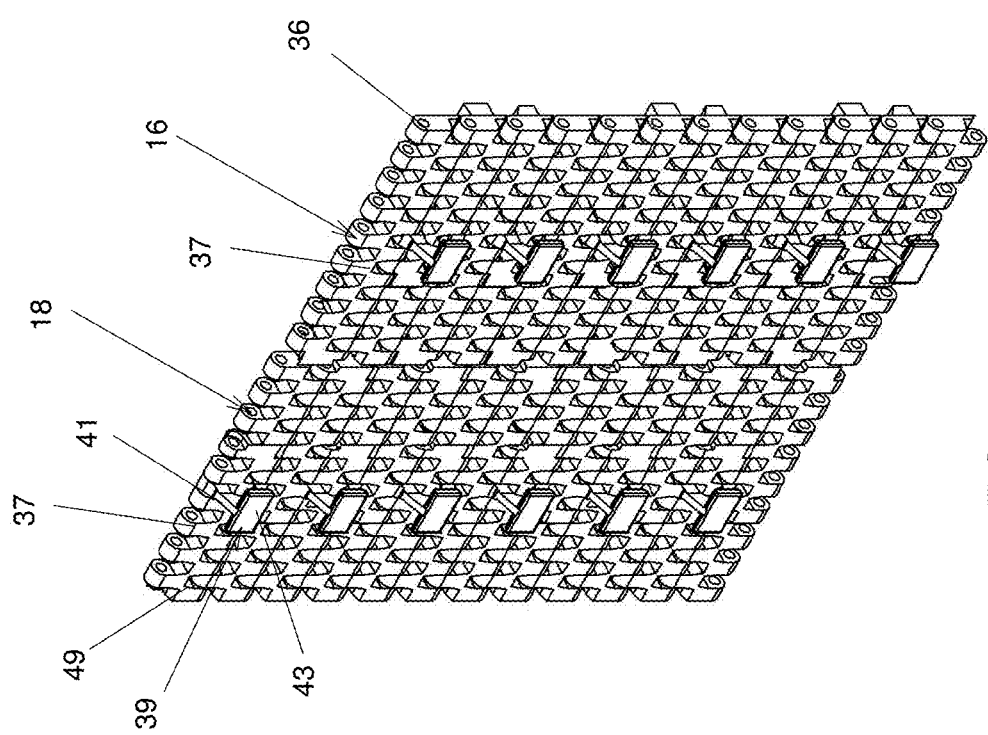
FIG. 5, in a partial alternative perspective view, illustrates the belts of FIGS. 3 and 4 the belts being in the first configuration.

Referring to FIG. 3 for example, the first and second belts 16 and 18 are substantially similar to each other and each include a plurality of belt elements 36 defining belt element outer and inner surfaces 35 and 37, the latter being visible in FIG. 5. The belt element outer surface 35 faces outwardly relative to the loop belt path 20. The belt elements 36 are typically each substantially planar and they substantially longitudinally extend from each other. The belt elements 36 each extend over a relatively short portion of the first and second belts 16 and 18 and secured to each other along the first and second belts 16 and 18 so as to articulated relative to each other to allow bending of the belt elements 36 around gears 40, 42 and 44, described in further details hereinbelow. It should be noted that for clarity reasons, the drawings illustrates only a few belt elements 36 and that the remainder of the first and second belts 16 and 18 is only schematically represented by a pair of parallel lines in FIGS. 1, 2, 6 and 7. As seen in FIG. 5, the belt elements 36 define apertures 49 therebetween that engage teeth of the gears (not shown in FIG. 5) that direct the first and second belts 16 and 18, and which are described in further details hereinbelow.

Belt guides 39 extend from the belt element inner surface 37 of some of the belt elements 36, typically at longitudinally substantially equidistantly spaced apart locations along the first and second belts 16 and 18. Each of the belt guides 39 includes a stem 41, extending from the belt inner surface 37, and an end member 43, which is typically substantially flat and extends from the stem 41 in a substantially parallel and spaced apart relationship relative to the belt element inner surface 37. The belt elements 36 are conventional and will not be described in further details herein.

The cleats 34a and 34b are secured to the belt element outer surface 35 in a conventional manner, for example using rivets 112, as shown in FIGS. 3 and 4. The cleats 34a and 34b are typically equidistant relative to each other on the belt from the first and second belts 16 and 18 to which they are attached. Thus, the cleats 34a and 34b define pairs of cleats 33 that are all equidistantly spaced from each other and in which the two cleats 34a and 34b are all spaced apart from each other by the same distance. Each pair of cleats 33 includes a cleat 34a secured to the first belt 16 and a cleat 34b secured to the second belt 18. The distance between the cleats 34a and 34b from each pair of cleats 33 is typically selected so that the caps 12a and 12b to sort fits between the cleats 34a and 34b from each pair with minimal space between the caps 12a and 12b and the cleats 34a and 34b. The thickness of the cleats 34a and 34b, in a direction away from the first and second belts 16 and 18, is typically smaller than the height of the caps 12a and 12b. It should be noted that in embodiments in which the cap sorter 10 includes more than two belts, some of the cleats 34a and 34b may be secured to more than one of those belts.

In some embodiments, the cleats 34a secured to the first belt 16 are substantially similar to the clears 34b secured to the second belt 18. However, in other embodiments, as shown in the drawings, the cleats 34a secured to the first belt 16 are of a first type and the cleats 34b secured to the second belt 18 are of a second type. The cleats 34a and 34b of the first and second types are substantially similar except for their cap receiving surface 90a and 90b respectively. The cap receiving surfaces 90a and 90b are the portion of the cleats 34a and 34b that face generally upwardly in the sorting section 24 and onto which the caps 12a and 12b may abut to be carried into the discharging section 26. One type of cleats 34a and 34b, for example the cleats 34a secured to the first belt 16, has a cap receiving surface 90a that is substantially perpendicular to the first and second belts 16 and 18. This cap receiving surface 90a is typically substantially planar and forms an angle that is about 90 degrees with the first and second belts 16 and 18. The other type of cleats 34a and 34b, for example the cleats 34b secured to the second belt 18, has a cap receiving surface 90b that is beveled. This type of cleats 34b has at least a portion thereof that is inclined relative to the first and second belts 16 and 18, and inclined relative to the vertical in the sorting section 24. Caps 12a and 12b may be supported on the cleats 34a of the first type, but fall from the cleats 34b of the second type. Of course, the types of cleats 34a and 34b that are attached to the first and second belts 16 and 18 may be reversed from the above example.

Referring to FIG. 2, wheels are operatively coupled to the body 14 to guide the first and second belts 16 and 18 along at least part of the belt path 20. In the present invention, the first and second belts 16 and 18, and more specifically the belt elements 36, are wound around wheels in the form of gears 40, 42 and 44 that define at least part of the belt path 20. For example, the gears 40, 42 and 44 form a right angled triangle with one side thereof vertical and another horizontal. To that effect, gears 40 are located at the top of the belt path 20. Gears 42 are provided at the bottom of the belt path 20, below the gears 40. Gears 44 are provided at the same level as the gears 42, offset relative to the gear 40. As further described hereinbelow, in some embodiments, a tension maintaining mechanism 45 is operatively coupled to the first and second belts 16 and 18, through the gears 40, 42 and 44, for maintaining a tension in the first and second belts 16 and 18 as a belt guiding element 56 is moved between the belt guiding element first and second configurations, as described in further details hereinbelow. Typically, there are four gears 40, four gears 42 and four gears 44 which are pairwise jointly rotatable. Each gear 40, 42 and 44 from a pair receives one of the first and second belts 16 and 18. The gears 40, 42 and 44 within each pair are linked to each other through an axle 51 so that these two gears 40, 42 and 44 are jointly rotatable. The gears 40, 42 and 44 from different pairs are however independently rotatable from each other.

At least one of the gears 40, 42 and 44 around which each of the first and second belts 16 add 18 is wound is a driven gear. For example, the gears 40 around which the first and second belts 16 and 18 are wound are respectively driven by first and second motors 46 and 48, which are part of the first and second belt actuators 30 and 32, through conventional shafts, gearboxes or gears, among other possibilities, which are not further described herein. In some embodiments, the first and second motors 46 and 48 are stepper motors, which facilitates control of the cap sorter 10. The first and second motors 46 and 48 may be independently actuated to selectively move either of the first and second belts 16 and 18. The other gears 42 and 44 are each typically freely rotatable.

In a specific embodiment of the invention, the cap receiving section 22, sorting section 24 and discharging section 26 extend successively from the gears 44 to the gears 40. The return section 27 extends from the gears 40, around the gears 42, and to the gears 44. The return section 27 includes two rectilinear segments 50 and 52, respectively between the gears 40 and 42 and between the gears 42 and 44.

The tension in the first and second belts 16 and 18 is maintained to a suitable value by the tension maintaining mechanism 45. For example, the gears 44 are mounted to the body 14 so as to be movable relative thereto and relative to the gears 42, which are fixed in position relative to the body 14. To that effect, as shown in FIG. 8, the gears 44 are for example mounted to a suitable guide 100 so as to be movable therealong. For example, the gears 44 are mounted all to a common axle 101. The guide 100 includes at least one, and typically a pair of laterally opposed slots 102 (one of which only being visible in FIG. 8) defined in the body 14 and a carriage 104 slidably mounted in each slot 102. The slot 102 is typically substantially horizontal and rectilinear, but other shapes and orientation are possible. Also, any other suitable guide is usable, such as a rail or other conventional structure usable for guiding elements along a predetermined path.

Returning to FIG. 2, a biasing element 54 extends between each pair of gears 44 and the body 14 and biases the gears 44 away from the gears 42. For example, the biasing element 54 is a gas spring, but other possibilities are within the scope of the invention. Also, in alternative embodiments, any other conventional manner of maintaining tension in the first and second belts 16 and 18 is within the scope of the invention, for example and non-limitingly using a suitable positioned coil spring or by using an actuator that actively moves the gears 44.

Sorting of the caps 12a and 12b can be customized to specific caps 12a and 12b by adjusting the slope of the sorting section 24. To that effect, as better seen in FIGS. 6A and 6B, a belt guiding element 56 is provided for guiding the first and second belts 16 and 18 at least in the sorting section 24 so that the first and second belts 16 and 18 have a predetermined shape in the sorting section 24, for example and non-limitingly a substantially rectilinear shape. In the embodiment of the cap sorter 10 described herein, the belt guiding element 56 is provided adjacent the cap receiving section 22, sorting section 24 and the discharging section 26. The belt guiding element 56 is configurable between at least two belt guiding element configurations, here the belt guiding element first and second configurations shown respectively in FIGS. 6A and 6B, so that the first and second belts 16 and 18 correspondingly achieve the two belt configurations. A belt inclination relative to the vertical of the first and second belts 16 and 18 differs between the belt guiding element first and second configurations. For example, in the guiding element first configuration, the cleats 34a and 34b extend downwardly from the first and second belts 16 and 18 in the sorting section 24, and, in the belt guiding element second configuration, the cleats 34a and 34b extend upwardly from the first and second belts 16 and 18 in the sorting section. For clarity, the cleats 34a and 34b do not extend directly upwardly or downwardly, that is vertically. The cleats 34a and 34b extend typically with a relatively small slope relative to the horizontal that is directed upwardly or downwardly. In the transition between such slopes, the cleats 34a and 34b extend horizontally. The belt guiding element 56 is operatively coupled to a belt guiding element actuator 59 that selectively moves the belt guiding element 56 between the different belt guiding element configurations. Typically, the belt guiding element 56 is continuously configurable between the belt guiding element first and second configurations. Tension in the first and second belts 16 and 18 is maintained during these changes in configuration due to the movements of the gears 44 and the tension maintaining mechanism 45.

The belt guiding element 56 is configured to receive the belt guides 39 so that the portion of the first and second belts 16 and 18 that is adjacent the belt guiding element 56 has a predetermined shape, which depends on the configuration of the belt guiding element 56. For example, the belt guiding element 56 includes two pairs of bands 58, made of a resiliently deformable material, for example relatively thin steel bands, and extending substantially parallel to each other. The belt guiding element first and second configurations are achieved by deforming the bands 58. A relatively narrow slot 61, narrower than the end members 43, extends between the bands 58 from each pair and receive therein the stems 41, substantially longitudinally along the belt path 20. The bands 58 are thus provided between the end members 43 and the belt element inner surfaces 37, which guide the first and second belts 16 and 18 so that the first and second belts 16 and 18 conform to the shape of the bands 58. Consequently, the belt guides 39 engaging the belt guiding element 56 in the sorting section 24 so that the at least one of the first and second belts 16 and 18, and typically both, conforms to a predetermined shape. The bands 58 are linked to each other by transversally extending coupling elements 60 that are secured to all the bands 58 at substantially longitudinally spaced apart locations therealong to ensure that all the bands 58 remain substantially parallel to each other along the whole belt guiding element 56. Therefore, bands 58 deform substantially similarly as the belt guiding element 56 is deformed between the belt guiding element first and second configurations.

Part of the bands 58 is typically fixedly mounted to the body 14 adjacent the discharging section 26, for example substantially vertically adjacent a first end of the bands 58. Also, referring to FIGS. 6A and 6B for example, the bands 58 are for example mounted a caddy 62 longitudinally spaced apart from the portion of the bands 58 that is fixed relative to the body 14, for example substantially opposed thereto adjacent the second end of the bands 58. The caddy 62 is selectively movable along a caddy guide 66, for example substantially horizontally. The caddy 62 is for example secured to suitably positioned coupling elements 60 so that moving the caddy 62 moves these coupling elements 60, which in turn deforms the bands 58.

The caddy guide 66 takes for example the form of a screw and the caddy 62 is mounted thereto using a threaded collar 70 so that when the screw is rotated about its longitudinal axis, the threaded collar 70 moves along the screw in a direction depending on the rotation direction. The screw is operatively coupled to the belt guiding element actuator 59 to be selectively rotatable therewith. In some embodiments, the caddy 62 defines a slider 106 that engages a slot 108 (seen in FIG. 8) formed in the body 14 and along which the slider 106 is movable.

In some embodiments, a second slider 64 is mounted between the caddy 62 and the discharging section 26. The second slider 64 is selectively movable along a second slider guide 68, for example at a slight angle relative to the horizontal. The second slider guide 68 takes for example the form of a slot into which the second slider 64 is mounted so as to be longitudinally movable therealong. The second slider 64 includes a detector for detecting the level of caps 12a and 12b above the cap receiving section 22, for example an optical detector. This detector is used so that a suitable quantity of caps 12a and 12b is always present on the cap receiving section by controlling the discharge of caps 12a and 12b from the hopper 28.

The belt guiding element actuator 59 may for example include a rotatable handle 72 jointly rotatable with an axle 74, the axle 74 being transversal to the screw forming the caddy guide 66 and coupled thereto through intermeshed conical gears 76 and 78, respectively mounted to the axle 74 and screw of the caddy guide 66, so that rotating the rotatable handle 72 rotates the screw. However, any other suitable belt guiding element actuator 59 is within the scope of the invention.

Typically, a controller 110 shown schematically in FIG. 2, controls the operation of the cap sorter 10. The controller 110 may include analog and digital components that synchronize the operation of the various elements of the cap sorter 10. While a completely analog controller is within the scope of the present invention, the controller 110 is typically a programmable digital controller including a microprocessor, memory chips and all the conventional components of programmable digital controllers. The controller 110 then runs a program element that allows control over the first and second belt actuators 30 and 32 and over the emission of the pulsed air jets by the nozzles 25 to sort the caps as described hereinbelow. Typically, the controller 110 also includes a user interface allowing the intended user of the cap sorter 10 to adjust various operational parameters of the cap sorter 10, such as the offset between the first and second belts 16 and 18, to suit the type of caps 12a and 12b to sort.

In use, the rotatable handle 72 is rotated until a suitable slope is achieved in the sorting section 24. The suitable slope is determined by the location of the centre of gravity of the caps 12a and 12b to sort. The slope changes as a function of the position of the caddy 62 along the caddy guide 66.

Then, offset between the first and second belts 16 and 18 is first adjusted by driving the first and second motors 46 and 48 at different speeds until a desired spacing between cleats 34a and 34b with each pair of cleats 33 is achieved. In some embodiments, this adjustment is made using a controller 110 that allows precise adjustment of the spacing between the cleats 34a and 34b and which is programmed to prevent relative movements between the first and second belts 16 and 18 that would result in the cleats 34a from the first belt 16 crashing into the cleats 34b from the second belt 18.

Finally, the sorting operation can begin in a conventional manner. Caps 12a and 12b are discharged by the hopper 28 into the cap receiving section 22. The first and second belts 16 and 18 rotate along the belt path 20 so that the part of the first and second belts 16 and 18 in the cap receiving section 22 moves to the sorting section 24, then to the discharging section 26 and finally to the return section 27. Caps 12a and 12b that are not inserted between cleats 34*a* and 34*b* from a pair of cleats 33 fall back to the cap receiving section 22 at the beginning of the sorting section 24. From the caps 12*a* and 12*b* that are properly inserted between cleats 34*a* and 34*b*, some will be oriented with their end wall away from the belt element outer surface 35. If a suitable slope has been selected in the sorting section 24, these caps 12*a* and 12*b* fall back to the cap receiving section 22, and the other caps remain on the cleats 34*a* until the discharging section 26 is reached. Discharging can be continuous, or the first and second belts 16 and 18 may be driven so that they briefly intermittently stop when caps 12*a* and 12*b* are adjacent the chute 31 to allow discharge of the caps 12*a* and 12*b*.

Although the present invention has been described hereinabove by way of preferred embodiments thereof, it can be modified, without departing from the spirit and nature of the subject invention as defined in the appended claims.

What is claimed is:

1. A cap sorter for sorting caps, said cap sorter comprising:
   first and second belts, said first and second belts being in a substantially adjacent and substantially parallel relationship relative to each other, said first and second belts traveling along a closed loop belt path defining a longitudinal direction therealong, said belt path defining a cap receiving section inclined from the vertical, a sorting section extending substantially upwardly from said cap receiving section, a discharging section provided above said sorting section and a return section extending from said discharging section and returning to said cap receiving section; and
   first and second belt actuators operatively coupled respectively to said first and second belts for moving respectively said first and second belts along said belt path;
   said first and second belts being each provided with a plurality of cleats mounted outside of said belt path, each of said cleats extending substantially laterally across both said first and second belts, said cleats being each secured to one of said first and second belts while being movable relative to an other one of said first and second belts, said cleats alternating between being secured to said first and second belts along said belt path;
   said first and second belts being selectively movable disjointly and jointly, wherein said first and second belts are moved disjointly by changing a phase between said first and second belt actuators to change a spacing between adjacent ones of said cleats and wherein said first and second belts are moved jointly along said belt path to sort said caps.

2. The cap sorter as defined in 1, further comprising a belt guiding element for guiding said first and second belts at least in said sorting section so that said first and second belts have a predetermined shape in said sorting section.

3. The cap sorter as defined in claim 2, wherein said belt guiding element is configurable between belt guiding element first and second configurations, wherein a belt inclination relative to the vertical of said first and second belts differs between said belt guiding element first and second configurations.

4. The cap sorter as defined 3, wherein said belt guiding element is continuously configurable between said belt guiding element first and second configurations.

5. The cap sorter as defined in claim 3, wherein said predetermined shape is substantially rectilinear.

6. The cap sorter as defined in claim 3, wherein, in said guiding element first configuration, said cleats face downwardly relative to said first and second belts in said sorting section, and, in said guiding element second configuration, said cleats face upwardly relative to said first and second belts in said sorting section.

7. The cap sorter as defined in claim 3, wherein said belt guiding element defines a slot extending substantially longitudinally along said belt path, said slot being flanked by two deformable bands that are substantially resiliently deformable, said belt guiding element first and second configurations being achieved by deforming said deformable bands.

8. The cap sorter as defined in claim 7, further comprising coupling elements, said deformable bands being linked to each other by said coupling elements which are each secured to both of said deformable bands at substantially longitudinally spaced apart locations along said deformable bands so that said deformable bands deform substantially similarly as said belt guiding element is deformed between said belt guiding element first and second configurations.

9. The cap sorter as defined in claim 7, further comprising a body and a caddy, said deformable bands being mounted to said caddy, said caddy being movable relative to said body to deform said deformable bands to move said belt guiding element between said belt guiding element first and second configurations.

10. The cap sorter as defined in claim 9, wherein said deformable bands each have a portion thereof that is fixed relative to said body spaced apart from said caddy.

11. The cap sorter as defined in claim 7, wherein at least one of said first and second belts defines belt guides extending therefrom at substantially longitudinally spaced apart locations therealong, said belt guides engaging said belt guiding element in said sorting section so that said at least one of said first and second belts conforms to said predetermined shape.

12. The cap sorter as defined in claim 11, wherein said at least one of said first and second belts defines a belt inner surface facing said deformable bands and a substantially opposed belt outer surface, said belt guides each including a stem extending from said belt inner surface and an end member extending from said stem opposed to said belt inner surface, said stem being insertable in said slot, said end member being wider than said slot.

13. The cap sorter as defined in claim 3, further comprising a tension maintaining mechanism operatively coupled to said first and second belts for maintaining a predetermined tension in said first and second belts as said belt guiding element is moved between said belt guiding element first and second configurations.

14. The cap sorter as defined in claim 13, further comprising a body and wheels operatively coupled to said body to guide said first and second belts along at least part of said belt path, said first and second belts being mounted to said wheels, at least one of said wheels being movable relative to said body to accommodate changes in said belt path when said belt guiding element is moved between said belt guiding element first and second configurations.

15. The cap sorter as defined in claim 14, further comprising a biasing element operatively coupled to said at least one of said wheels and to said body to maintain said predetermined tension.

16. The cap sorter as defined in claim 1, wherein said cleats each define a cap receiving surface facing generally upwardly in said sorting section, said cap receiving surfaces being of a first type for said cleats mounted to said first belt and of a second type for said cleats mounted to said second belt, said cap receiving surface of said cleats of one of said first and second types being substantially perpendicular to said first and second belts and said cap receiving surface of said cleats of an other one of said first and second types being beveled.

17. The cap sorter as defined in claim 1, wherein said first and second belts each include a plurality of substantially planar belt elements substantially longitudinally extending from each other and articulated relative to each other.

18. The cap sorter as defined in claim 1, further comprising a nozzle substantially adjacent said discharging section for delivering air jets to said caps in said discharging section to transversally move said caps relative to said cleats.

19. The cap sorter as defined in claim 1, wherein said first and second actuators each include a stepper servo motor.

20. The cap sorter as defined in claim 1, further comprising a cap providing element configured for providing said caps on at least one of said first and second belts in said cap receiving section.

21. The cap sorter as defined in claim 20, wherein said cap providing element includes a hopper, said hopper including a cap discharge provided above said cap receiving section, said hopper discharging said caps on said cap receiving section through said cap discharge.

* * * * *